United States Patent [19]

McGregor et al.

[11] Patent Number: 5,080,124
[45] Date of Patent: Jan. 14, 1992

[54] RUPTURE DISC PRESSURE RELIEF DEVICE

[75] Inventors: Gavin McGregor, Gloucester; William J. Wells, Winnipeg; Marmud U. Islam, Gloucester, all of Canada

[73] Assignee: National Research Council of Canada, Ottawa, Canada

[21] Appl. No.: 587,005

[22] Filed: Sep. 25, 1990

[30] Foreign Application Priority Data

Sep. 28, 1989 [CA] Canada ................................ 614177

[51] Int. Cl.⁵ ............................................ F16K 17/16
[52] U.S. Cl. ................................. 137/68.1; 220/89.2
[58] Field of Search ................ 220/89.1, 89.3, 89.2; 137/68.1, 68.2

[56] References Cited

U.S. PATENT DOCUMENTS

| | | | |
|---|---|---|---|
| 3,445,032 | 5/1969 | Raidl, Jr. et al. | 220/89 |
| 3,845,879 | 11/1974 | Dernbach et al. | 220/89.2 |
| 4,278,181 | 7/1981 | Wood et al. | 137/68.1 X |
| 4,512,491 | 4/1985 | DeGood et al. | 137/68.1 X |
| 4,809,729 | 3/1989 | Muddiman | 137/68.1 |
| 4,819,823 | 4/1989 | Kadakia et al. | 220/89 |

Primary Examiner—Martin P. Schwadron
Assistant Examiner—Kevin L. Lee
Attorney, Agent, or Firm—John F. Leman

[57] ABSTRACT

A two-part concave-convex rupture disc for use in a safety pressure relief device comprises one part which is perforated with lines of small holes that introduce controlled weakness in the disc and the other part which acts as a seal. When the pressure in a fluid on the convex side of the discs exceeds a predetermined limit, the discs will reverse their direction of convexity and the metal of which the perforated disc is made will tear cleanly along the lines of perforation and rupture so as to release the fluid in which the excess pressure occurred. The pressure at which the rupture occurs is determined by the choice of the size and spacing of the perforating holes, as well as the choice of the thickness, the material of which the discs are made, and the pressure used to form the discs.

6 Claims, 1 Drawing Sheet

RUPTURE DISC PRESSURE RELIEF DEVICE

BACKGROUND OF THE INVENTION

1. Field of the Invention

The invention relates to discs which protect fluid systems from excessive pressure by rupturing at a predetermined pressure so as to release fluid from the system thereby lowering the pressure.

2. Description of the Prior Art

Overpressure relief devices have been used for many years to provide protection of equipment and people against excessive fluid pressure in a system or vessel. A common type of overpressure relief device uses a disc that is designed to rupture at a predetermined pressure. It is, in effect, a planned point of weakness in the pressure system. When the disc ruptures, the fluid which has the excessive pressure passes through the rupture opening and is either collected or discharged into the surroundings. This avoids a catastrophic failure of the system or vessel at another point.

It has been found that a cupped disc, with the convex side facing in the direction of the potential excess pressure, works well for this purpose. It will withstand for long periods pressures that are near to the predetermined rupture pressure, and will usually rupture immediately when the predetermined pressure is exceeded. Since the process of rupturing involves a reversal of the direction of convexity of the disc, this type of disc may be described as a reverse-buckling rupture disc.

The usual manufacturing procedure is to produce a batch of identical discs made of identical material, and then test some of them to discover the pressure at which typical discs in the batch will rupture. The characteristics of the tested discs are ascribed to the remaining discs in the batch, which are then put on the market.

Discs that are designed to rupture from overpressure on the concave side are also known in the art, and may be described as pre-bulged rupture discs. The present invention does not concern these, but is instead directed to reverse-buckling rupture discs.

A problem with previous rupture discs is that the rupture sometimes fails to produce a large hole and therefore fails to provide a definite and complete release of the pressure. A further problem is that discs sometimes fragment upon rupturing, and thereby release pieces of metal that may be dangerous to people or to the part of the system provided to collect the discharged fluid.

The completeness and cleanness of the rupture of the reverse-buckling rupture discs has previously been enhanced in two ways. One way is the provision of knife blades on the concave side of the disc, so that when the disc reverse-buckles, the knife blades slice the disc and thereby ensure that the opening is large and clean. Another way is the scoring of the disc during the manufacturing process, thereby introducing lines of weakness that are lines of potential cleavage when reverse-buckling occurs.

Two disadvantages of the method of providing knives are that the knives become dull after a number of ruptures or as a result of corrosion, and they may be dislodged and become inoperative. Both these problems cause the system to be unreliable. A third disadvantage of using knives is that an additional structure to support the knives adds to the size, weight and complexity of the device. A fourth disadvantage is that the method of using knives is costly in the manufacturing stage and costly for the periodic maintenance of sharpening the knife edges.

The principal disadvantage of a disc which has been scored is that the completeness of rupturing is not highly reliable. Scoring may improve the reliability of complete opening, but there are occasions when a scored disc does not open completely and therefore impedes the release of the pressure. Another disadvantage of scoring the discs is that the manufacturing process is troublesome and is costly because of the frequent need to maintain the instrument used to make the scores. The scores may also have an effect on the rupture pressure which is difficult to predict, although in a reverse-buckling rupture disc the effect is probably small because the main factors which determine the rupture pressure are the nature of the disc material, the thickness of the disc, and the pressure used to make the bulge in the disc.

The present invention discloses a type of reverse-buckling rupture disc that is manufactured in a way that ensures complete opening without fragmentation when the disc reverse-buckles. As soon as a certain pressure is reached, the disc reverse-buckles and after reversing it ruptures almost instantaneously.

SUMMARY OF THE INVENTION

The present invention is directed to the provision of points of weakness in a reverse-buckling rupture disc. These points are in the form of many holes, either round or elongated, which penetrate the disc and are arrayed in straight or curved lines. The capability of an industrial cutting laser to produce small holes at a small cost makes this invention practical and economically efficient.

By the present invention, there is provided in an overpressure relief device having a rupture disc supported between inlet and outlet supporting members, said rupture disc having a concave-convex region with the convex surface facing said inlet supporting member and said disc being adapted to reverse the direction of convexity and rupture if the pressure in a fluid on the inlet side exceeds a predetermined limit, the improvement comprising:

said disc being perforated by a plurality of holes that are small in comparison with the size of said disc and that are arrayed in one or more lines such that, when an excess of pressure on the inlet side causes said disc to reverse the direction of convexity, said disc will break along the line or lines of holes without fragmentation, said disc being covered on its convex side with a sealing member adapted to fit closely against said disc, said sealing member being adapted to prevent leakage of fluid through said holes, said sealing member being made of material that permits reversal of the direction of convexity of said sealing member, and said sealing member being made of material that ruptures readily when said disc and said sealing member reverse their direction of convexity and said disc ruptures.

It has been discovered that a cupped disc with perforations withstands fluid pressure up to a determinable limit, and then reverse-buckles and ruptures suddenly when a limiting pressure is exceeded. The disc opens cleanly along the line of perforations, and if the lines of perforations do not completely or virtually surround any area, no material will detach from the main body of the disc and no fragments will be lost upon rupturing.

The disc of the present invention can be made in a great variety of sizes and shapes, including all sizes and shapes presently known to be used for reverse-buckling rupture discs. Rupture discs ranging in diameter from one inch to twenty-four inches are standard catalogue items well known in the trade.

The first step in manufacturing the rupture disc is the cutting process. A circular disc is cut from sheet metal by any method known in the art. A convenient and economical method would be cutting by an industrial laser. The metals commonly used for rupture discs are aluminum, nickel, monel, inconel and stainless steel, but the present invention is not limited to those metals. The metal will usually have been annealed while in the flat sheet, but it is conceivable that non-annealed metal would be an appropriate choice for certain applications or that the disc could be annealed after it has been through the doming process that is the second step in the making of the rupture disc. An important factor in the choice of metal is the environment in which the disc will be used, especially considerations of temperature and corrosion from contacting fluids.

The second manufacturing step is the doming process, in which the flat sheet disc is deformed into the domed form that is required for a reverse-buckling rupture disc, using methods well known in the art. The flat circle is clamped between a pair of supporting members, one of which is sealingly connected to a source of pressurized fluid, such as pressurized air or water. A concave-convex dome is formed in the disc by applying fluid pressure on one side of the disc to a level exceeding the yield point of the metal of the disc. The dome then forms in the direction away from the source of pressure. The pressure applied in this process is a significant determinant of the pressure at which the disc will reverse-buckle and rupture.

A third optional manufacturing step is an annealing process, in which the domed disc is heated and allowed to cool slowly so that stresses created by the doming process are relieved. This process is well known in the art. Annealing is not usually required for reverse-buckling discs. Whether it is required depends on the choice of the metal of the disc. If it is required, this would be the likely place in the sequence of steps for it to be done, but it must be understood that the annealing step is not a part of the present invention and is essentially an aspect of the choice of the metal.

The fourth manufacturing step is the perforating process, which produces the most innovative aspect of the present invention. The method and techniques of perforating are well known in the art, but the application of perforations to rupture discs is new and useful. The domed disc is clamped in a suitable holder and the focused beam from an industrial laser is used to cut a small hole in the disc. Either the laser or the clamp is moved slightly, and another hole is produced near the first hole. A series of holes, arrayed in one or more straight or curved lines, is produced by stepping through many relative positions of the laser and the disc, usually in an automatic manner using a numerically-controlled laser cutting machine that is well known in the art. The laser may be of the type commonly known as a YAG laser or of the type commonly known as a Carbon Dioxide or CO-2 laser, the choice depending mainly on the reflectivity and other characteristics of the metal of the disc. If the metal is thick, the focused laser beam may be pulsed many times to produce a single hole, according to practices well known in the art.

The method of perforating with a laser beam is the most convenient and economical method of producing the holes, because the size of the holes is small and the holes are closely spaced. In principle, the holes could be formed by other methods, such as drilling, but those methods are impractical for producing so many and such closely spaced small holes.

The holes may be elongated, in which case they could aptly be called slots, but the word holes will be used in general for convenience. There is no necessity that all holes in one disc or amongst various discs be the same size, nor that the spacing between holes be uniform.

It has been discovered that the pressure at which the rupture disc will reverse and rupture is partly affected by the choice of the size of the holes and the distances between the holes. As with all reverse-buckling rupture discs, the other factors which are the most important determinants of the pressure at which the disc will reverse are: the pressure used in the doming process, the choice of the metal for the disc, and the thickness of the disc. The process of reversing involves the flexing of the narrow bridges of metal that are between the holes in the line of the holes. The more metal that must flex, the higher the pressure required for rupture. The larger the holes, the easier it is for the holes to compress slightly as the reverse-buckling occurs and the lower the pressure required for reverse-buckling.

The fifth manufacturing step is the provision of the membrane, by which the surface of the disc that will be in contact with the region of potentially excessive pressure is provided with a covering membrane that will prevent fluid from passing though the perforated holes. The membrane may be a coating applied to the perforated domed disc by dipping or spraying, like a layer of paint, or it may be a separate domed disc of suitable material. A wide range of materials is possible; metal, rubber, latex, and nylon are examples. The choice of membrane material will depend mainly on the environment in which the reverse-buckling rupture disc will be placed, because the membrane will be in contact with the fluid whose potentially excessive pressure must be released by the rupture disc.

If the membrane is a metal disc, it can be formed in the doming process (the second stage of manufacturing) at the same time as the reverse-buckling rupture disc that the membrane matches, by the simple method of putting the flat metal membrane beside the flat disc and applying the bulging pressure to both discs at the same time.

The method of supporting and attaching the membrane must be chosen with consideration for the usual desire to prevent fragments of the membrane from becoming detached during the rupture process. Detached fragments are a hazard to personal safety and to the collection system provided to catch the outflow after the disc ruptures. Different methods of preventing detachment will be suitable for different materials, and will be evident to those skilled in the art of rupture discs. For example, a coating of rubber is inherently attached to the rupture disc and is not likely to become detached. A separate metal membrane may need to be fastened, such as by an adhesive or by spot welding, to the rupture disc, depending on the frangibility of the metal of the membrane.

The membrane offers an additional advantage, because it may be chosen to resist corrosion that the underlying perforated disc would not resist. Although the rupture disc will be fully effective if the membrane covers no more than the region of the dome containing the holes, it would be normal to cover the entire convex side of the rupture disc with the membrane, including the flange if there is a flange. Therefore, the fluid whose pressure may become excessive will not be in contact with the metal of the rupture disc, and no problem would arise from the fact that the metal is one which would react chemically with the fluid.

The membrane should be a material that tears easily, so that it will rupture readily when the disc has reverse-buckled. The tearing process does not begin until the rupture disc has reverse-buckled. The usual embodiment of the invention makes use of a membrane that has little rigidity, so that the effect of the membrane on the pressure at which reverse-buckling occurs is small. Therefore, the rupture pressure will be determined by the characteristics of the perforated metal disc and not by the membrane. An embodiment of the invention in which the membrane has a significant effect on the pressure at which reverse-buckling occurs is conceivable, but might more aptly be described as an arrangement of two contiguous rupture discs rather than a rupture disc having a membrane. Such an arrangement is not a preferred embodiment, because the normal small uncertainty in the rupture pressure of any rupture disc will be compounded for the assembly consisting essentially of two rupture discs, and the final uncertainty in the product in use will be greater.

The sixth step is the testing of some domed discs, complete with membranes, selected at random from a batch that has been produced so as to be essentially identical in all respects, including in respect of the perforations. The characteristics of the tested discs are ascribed to the remaining discs in the batch, which can then be labelled with a nominal rupture pressure and put on the market. Our experiments have shown that the consistency of rupture pressures amongst members of a batch is very high. A small number of any batch can be tested in order to confidently characterize the others in the batch in terms of rupture pressure.

The main factors that determine the rupture pressure are:
(1) the material of which the disc is made,
(2) the thickness of the material of the disc,
(3) the pressure at which the dome was initially formed,
(4) the number of holes and the pattern of lines of holes,
(5) the average distance between holes,
(6) the rigidity of the membrane, which is usually low.

There are many possible patterns of lines of holes which would be effective for the purpose of this invention. In general, the holes are confined to the domed part of the rupture disc, because holes on the flange would have no usefulness in the tearing process. In other words, the holes do not extend beyond the base of the dome, which is the circle where the curved dome changes to become the flat flange.

One embodiment of the invention has three lines of holes which run from points near the base of the dome through the centre of the dome to a point diagonally opposite and near the base of the dome. The three lines therefore intersect at the centre of the dome, and could also be described as six radial lines from the centre of the dome. When such a disc ruptures, there will be six pointed segments directed in the direction of the outflowing fluid. These six segments will remain attached to the disc along a base line near the base of the dome. That base line will be approximately along the line joining the ends of the lines of perforated holes.

Another embodiment of the invention has only two lines of perforated holes and will have four pointed segments in the direction of the outflowing fluid after rupture. Yet other embodiments have four or more intersecting lines of perforated holes, and will produce correspondingly greater numbers of segments upon rupturing.

Another embodiment of the invention has three or more curved lines running from the centre of the dome to near the base of the dome, in a manner resembling a pinwheel or a three-arm spiral galaxy.

Other embodiments of the invention have non-straight intersecting lines of perforated holes which may be described as wavy lines, but in general there must be three or more lines of holes running from the approximate centre of the dome to points near the base of the dome, unless the line of holes is in a reversing spiral form, as will now be described.

Another embodiment of the invention uses a single line of holes that extends from a point near the base of the rupture disc to a point at or near the centre of the rupture disc and back to a point near the base without crossing itself, in a manner that could be described as a reversing spiral. The holes could be round or could be elongated. The exact shape of the spiral is not important, but the best practice would be to have the distance between the inbound and outbound portions of the spiral increasing towards the periphery of the disc. In other words, if the single line is thought of as two portions that meet near the centre of the disc, one inbound line and one outbound line, those two lines should be farther apart near the base of the dome than near the centre of the dome. The reason for the increasing distance between the two portions of the line is to reduce the possibility that, upon rupturing, the disc will tear across from the inbound portion to the outbound portion and allow a fragment to become detached.

When a disc with the reversing-spiral pattern of holes ruptures, the material of the disc between the two lines of the reversing spiral will extend in the direction of the outflowing fluid, and will remain attached to the body of the rupture disc along a base line joining the two ends of the reversing-spiral line of holes. The relative positions of the two ends of the line of holes is not important except that the distance between two ends of the line must be sufficiently long to define a base of the reversing spiral that will not tear when the disc ruptures. Upon rupturing, the material of the disc between each of the many holes will tear, but the material between the holes at the two ends of the line should not tear, for if it does a fragment of the disc will become detached and could cause injury or damage.

BRIEF DESCRIPTION OF THE DRAWINGS

Various objects, features and advantages of the present invention will become apparent from a consideration of the following detailed description and from the accompanying drawing.

DETAILED DESCRIPTION OF THE PREFERRED EMBODIMENTS

Figure 1:
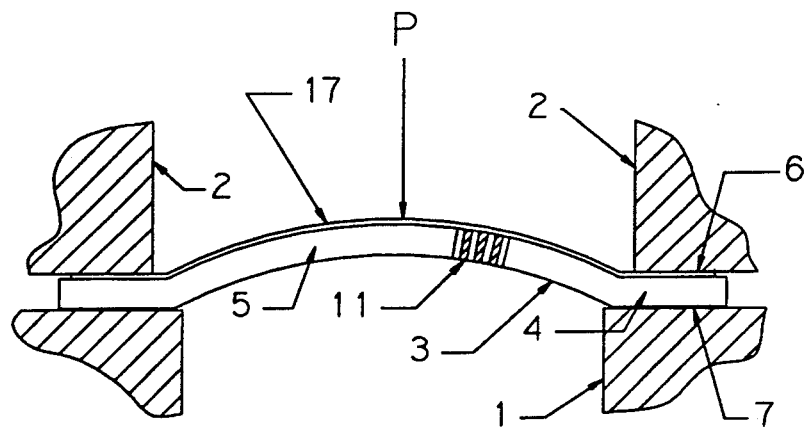
FIG. 1 is a side cross-sectional view of a perforated reverse-buckling rupture disc as it would be installed in a typical safety pressure relief apparatus.

FIG. 1 shows a portion of a typical safety pressure relief apparatus comprising the annular supporting members 1 and 2 and the rupture disc 3. The supporting members 1 and 2 can take a variety of forms, including flanges which are adapted for welding or threading and members which are adapted for clamping between conventional pipe flanges. The rupture disc 3 is sealingly clamped between the supporting members, usually by means of a plurality of screws positioned around the peripheral portions of the supporting members so as to fasten member 1 to member 2.

The rupture disc 3 is a reverse-buckling type of rupture disc, so that the fluid pressure from the vessel or system being protected is exerted on the convex side of the dome, as indicated by the letter "P" in FIG. 1. There will, in general, be some pressure on the concave side of the dome; this will often simply be atmospheric pressure, but could be higher or lower than atmospheric pressure. For the purpose of this specification, the pressure on the convex side of the dome will be measured with respect to the pressure on the concave side of the dome, so that the pressure on the convex side of the dome is actually the difference in the pressures across the dome.

The supporting member 2 will be sealingly connected with the vessel or system being protected. The supporting member z is on the side of the rupture disc where potential excess pressure is to be prevented, and could aptly be called the inlet side of the rupture disc assembly. When the fluid pressure on the inlet side exceeds the predetermined limit at which the rupture disc is intended to release the pressure, the disc will deform so as to reverse its direction of convexity, and after approximately fully reversing the disc will rupture.

The rupture disc 3 can have a range of shapes always including a concave-convex dome. The rupture disc shown is circular with an annular flat flange 4 surrounding the dome 5. In this form, the annular flat flange 4 is sealingly clamped between the complementary annular flat seating surfaces 6 and 7 of the supporting members 1 and 2.

In another embodiment, the annular flange 4 is not flat in the plane of the base of the dome but is uniformly bent in the direction of the dome. In that case, neither of the annular seating surfaces 6 and 7 of supporting members 1 and 2, respectively, would lie in a plane.

In yet another embodiment, the rupture disc may have no flange and the diameter of the opening in supporting member 2 will be smaller than the diameter of the rupture disc, will approximately conform to the curvature of the dome over a short distance, and will be larger than the diameter of the opening in supporting member 1.

There are many possible embodiments of the flange 4 and seating surfaces 6 and 7, which will be evident to those skilled in the art. The important aspect of all rupture discs is that the disc be capable of being seated securely in the supporting structure, and many variations of flanges and seating surfaces will accomplish that.

Figure 2:
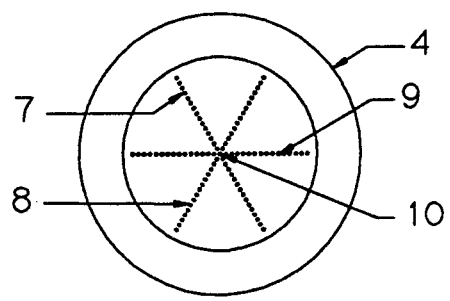
FIG. 2 is a top plan view of the perforated reverse-buckling rupture disc of FIG. 1 without the membrane.

In order to create lines of weakness in the dome 5 of the rupture disc 3, holes are perforated through the dome portion of the rupture disc 3. These holes are arrayed in lines of holes, and FIG. 2 shows for example three straight intersecting lines of holes 7, 8, and 9. In all Figures, the holes are not shown to scale but are drawn disproportionately large for clarity. In other embodiments, the number of intersecting lines of holes might be more than three, or could be only two. The three lines of holes in FIG. 2 all intersect at the approximate centre 10 of the rupture disc and are straight radial lines as seen in projection of the dome onto a flat surface, but other configurations of lines are possible and will be described below. The holes do not extend to the flange 4.

FIG. 1 shows four typical holes 11 (not drawn to scale) in one section of the rupture disc, but it must be remembered that there are many more such holes. These holes pass completely through the rupture disc 3 in a direction substantially following a radius of curvature of the dome 5. Typically, the holes are round and have a diameter of approximately five one-thousandths (0.005) of an inch. The holes are readily formed by a focused laser beam from a laser of the type commonly known as a YAG laser or of the type commonly known as a Carbon Dioxide or CO-2 laser.

Figures 3, 4:
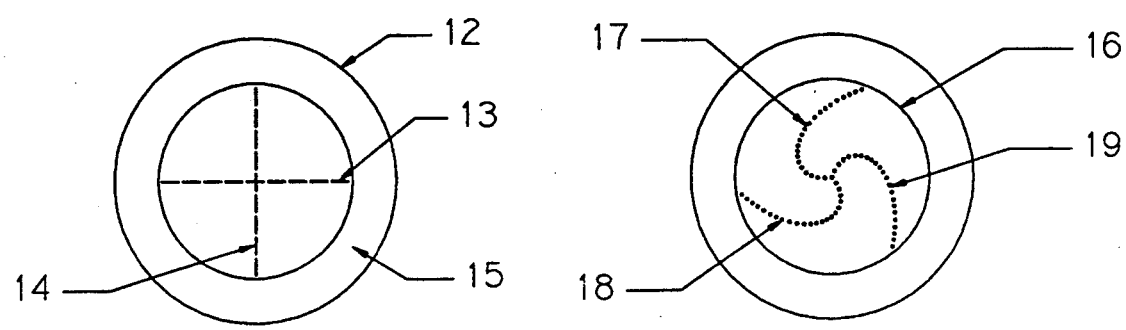
FIG. 3 is a top plan view of a perforated reverse-buckling rupture disc without the membrane and having holes that are elongated into slots arrayed in straight lines.
FIG. 4 is a top plan view of a perforated reverse-buckling rupture disc without the membrane and having three spiral lines of holes extending from the centre of the dome to near the periphery of the dome.

In another embodiment, shown in FIG. 3, a rupture disc 12 contains a line of holes 13 and each hole is elongated so that it could aptly be called a slot. The elongation of the slots is in the direction of the line of holes 13 in which the slots are arrayed, and the slots typically are spaced such that the distance between the adjacent ends of the slots is more than one-tenth of the width of the slots and less than two times the length of the slots. FIG. 3 shows only two intersecting lines of holes, 13 and 14, but a greater number would be possible, although the use of more than five lines of holes would be unlikely to provide additional benefits. The rupture disc illustrated in FIG. 3 has a flange 15. The slots do not extend to the flange 15.

The slots, in the embodiment shown in FIG. 3, are typically five one-thousandths (0.005) of an inch wide and from one one-hundredth (0.010) to one-tenth (0.100) of an inch long. It is not necessary that all slots in a rupture disc be the same size and shape, and it would be possible for a rupture disc to have a mixture of slots and round holes in the same line or in different lines.

In another embodiment, shown in FIG. 4, a rupture disc 16 contains three spiral lines of holes 17, 18, and 19, which radiate from the approximate centre of the dome to points near the periphery of the dome. The holes could be round or could be elongated, and the exact shape of the spiral is not important. The relative positions of the ends of the lines 17, 18 and 19 should be approximately equally spaced around the base of the dome so that the distance between the end-of-line points will be sufficiently long to avoid tearing between the ends of the lines and detachment of segments of the rupture disc.

FIG. 1 shows a membrane 17 which is an essential part of the present invention in all forms. The membrane prevents the fluid from leaking through the holes in the rupture disc from the side where the pressure is highest (normally the inlet side) to the other side. The membrane is typically co-extensive with the dome portion of the rupture disc, but the exact extent is not critical except for the requirement that the membrane must cover all the holes in the rupture disc. The membrane may be made of material that resists corrosion by the fluid on the inlet side better than the rupture disc would resist such corrosion.

Thus, the present invention is well adapted to carry out the objects and attain the ends and advantages mentioned, as well as those inherent therein. While presently preferred embodiments of this invention have been described for purposes of this disclosure, numerous changes in the order of fabrication, arrangement of parts, and configuration of the rupture discs will suggest themselves to those skilled in the art. Those changes are encompassed within the spirit of this invention and the scope of the appended claims.

We claim:

1. In an overpressure relief device having a rupture disc supported between inlet and outlet supporting members, said rupture disc having a concave-convex region with a convex surface facing said inlet supporting member and said disc being adapted to reverse the direction of convexity and rupture if the pressure in a fluid on the inlet side exceeds a predetermined limit, the improvement comprising:

said disc being perforated by a plurality of holes that are small in comparison with the size of said disc, substantially cylindrical and spaced such that the distance between the adjacent edges of the holes is more than one-tenth of the diameter of the holes and less than two times the diameter of the holes, and that are arrayed in one or more lines such that, when an excess of pressure on the inlet side causes said disc to reverse the direction of convexity, said disc will break along the line or lines of holes without fragmentation, said disc being covered on its convex side with a sealing member adapted to fit closely against said disc, said sealing member being adapted to prevent leakage of fluid through said holes, said sealing member being made of material that permits reversal of the direction of convexity of said sealing member, and said sealing member being made of material that ruptures readily when said disc and said sealing member reverse their direction of convexity and said disc ruptures.

2. The overpressure relief device of claim 1 wherein said holes are arrayed in three or more lines of perforations that extend from a common point at or near the centre of said disc to points near the periphery of the concave-convex portion of said disc.

3. The overpressure relief device of claim 1 wherein said holes are arrayed in a single line that extends in a spiral fashion from a point near the periphery of the concave-convex portion of said disc to a point at or near the centre of said disc and continues in a spiral fashion without intersecting itself back to another point near the periphery of the concave-convex portion of said disc.

4. In an overpressure relief device having a rupture disc supported between inlet and outlet supporting members, said rupture disc having a concave-convex region with the convex surface facing said inlet supporting member and said disc being adapted to reverse the direction of convexity and rupture if the pressure in a fluid on the inlet side exceeds a predetermined limit, the improvement comprising:

said disc being perforated by a plurality of holes that are small in comparison with the size of said disk elongated in the direction of the line in which they are arrayed and are spaced such that the distance between the adjacent ends of the holes is more than one-tenth of the width of the holes and less than two times the length of the holes, and that are arrayed in one or more lines such that, when an excess of pressure on the inlet side causes said disc to reverse the direction of convexity, said disc will break along the line or lines of holes without fragmentation, said disk being covered on its convex side with a sealing member adapted to fit closely against said disc, said sealing member being adapted to prevent leakage of fluid through said holes, said sealing member being made of material that permits reversal of the direction of convexity of sealing member, and said sealing member being made of material that ruptures readily when said disc and said sealing member reverse their direction of convexity and said disc ruptures.

5. The overpressure relief device of claim 1 or claim 4 wherein said sealing member is a separate disc which is bonded to said rupture disc by a process of spot welding at multiple points within said concave-convex region of said rupture disc or by an adhesive substance covering a large fraction of the area of said concave-convex region of said rupture disc.

6. The overpressure relief device of claim 1 or claim 4 wherein said sealing members is a coating applied to said rupture disc by a process of spraying or dipping.

* * * * *

UNITED STATES PATENT AND TRADEMARK OFFICE
CERTIFICATE OF CORRECTION

PATENT NO. : 5,080,124

DATED : Jan. 14, 1992

INVENTOR(S) : McGregor et al

It is certified that error appears in the above-identified patent and that said Letters Patent is hereby corrected as shown below:

On the title page, item [75] Inventors: Please change the third inventor "Marmud U. Islam" to read --Mahmud U. Islam--.

Signed and Sealed this

Thirtieth Day of June, 1992

Attest:

DOUGLAS B. COMER

*Attesting Officer*         Acting Commissioner of Patents and Trademarks